(12) United States Patent
Li et al.

(10) Patent No.: US 11,653,430 B2
(45) Date of Patent: May 16, 2023

(54) LAMP CONTROL SYSTEM

(71) Applicant: ETI Solid State Lighting (Zhuhai) Ltd., Zhuhai (CN)

(72) Inventors: Tinghong Li, Zhuhai (CN); Xiaobing Luo, Zhuhai (CN); Huasheng Zhao, Zhuhai (CN)

(73) Assignee: ETI Solid State Lighting (Zhuhai) Ltd., Zhuhai (CN)

( * ) Notice: Subject to any disclaimer, the term of this patent is extended or adjusted under 35 U.S.C. 154(b) by 0 days.

(21) Appl. No.: 17/528,546

(22) Filed: Nov. 17, 2021

(65) Prior Publication Data

US 2022/0174798 A1 Jun. 2, 2022

(30) Foreign Application Priority Data

Dec. 1, 2020 (CN) .......................... 202022845539.0

(51) Int. Cl.
*H05B 45/34* (2020.01)
*H05B 45/375* (2020.01)
*H05B 45/50* (2022.01)

(52) U.S. Cl.
CPC .......... *H05B 45/34* (2020.01); *H05B 45/375* (2020.01); *H05B 45/50* (2020.01)

(58) Field of Classification Search
CPC ...... H05B 45/34; H05B 45/375; H05B 45/50; H05B 45/10; H05B 45/20; H05B 45/36
See application file for complete search history.

(56) References Cited

U.S. PATENT DOCUMENTS

| 2013/0063047 A1* | 3/2013 | Veskovic | ............. H05B 45/385 |
| | | | 315/307 |
| 2014/0300274 A1* | 10/2014 | Acatrinei | ................ F21K 9/232 |
| | | | 315/122 |

FOREIGN PATENT DOCUMENTS

CN 112233888 A * 1/2021 ............. H01F 19/04

\* cited by examiner

*Primary Examiner* — Daniel D Chang (57) ABSTRACT

Disclosed are a lamp control system and a control method thereof. The lamp control system includes: an LED light source assembly, an AC input end, an on-off switch, an EMI filter circuit, a rectifier filter circuit, a buck circuit, a rectifier output circuit, a voltage stabilizing circuit, and a control circuit; the EMI filter circuit is connected to the AC input end through the on-off switch; the EMI filter circuit, the rectifier filter circuit, the buck circuit, and the rectifier output circuit are electrically connected in sequence; the rectifier filter circuit, the voltage stabilizing circuit, the control circuit, and the buck circuit form a closed-loop circuit, the rectifier output circuit is electrically connected to the LED light source assembly.

10 Claims, 9 Drawing Sheets

LAMP CONTROL SYSTEM

CROSS-REFERENCE TO RELATED APPLICATIONS

This application claims priority to and benefit from Chinese Patent Application No. 202022845539.0, filed Dec. 1, 2020, entitled LAMP CONTROL SYSTEM, the specification of which is incorporated by reference herein in its entirety.

TECHNICAL FIELD

The present disclosure relates to the field of lamp control, and particularly to a lamp control system.

BACKGROUND

As the fourth-generation lighting source, the LED light source is gradually replacing incandescent and fluorescent light sources due to its significant energy saving and lifespan advantages.

With the development of the society, different use occasions and different environments in life have different requirements for color temperature and brightness. At present, the dimming manners of the LED lights are divided into two types: DC dimming and PWM dimming. The PWM is a pulse width adjustment, which is a very effective technology that uses digital outputs of a microprocessor to control analog circuits, and is widely used in many fields from measurement and communication to power control and conversion.

However, the current lamps on the market are difficult to achieve brightness adjustment while the color temperature adjustment is implemented, and the circuit structure is complicated, and the hardware cost is high.

SUMMARY

The purpose of the present disclosure is to provide a lamp control system, which has simple operation, easy realization of brightness adjustment while the color temperature adjustment is implemented, simple circuit structure and low hardware cost.

The technical solution is provided is as follows.

A lamp control system includes: an LED light source assembly, an AC input end, an on-off switch, an EMI filter circuit, a rectifier filter circuit, a buck circuit, a rectifier output circuit, a voltage stabilizing circuit, and a control circuit; the EMI filter circuit is connected to the AC input end through the on-off switch; the EMI filter circuit, the rectifier filter circuit, the buck circuit, and the rectifier output circuit are electrically connected in sequence; the rectifier filter circuit, the voltage stabilizing circuit, the control circuit, and the buck circuit form a closed-loop circuit, the rectifier output circuit is electrically connected to the LED light source assembly.

In an embodiment, the EMI filter circuit comprises a first capacitor, a second capacitor, a third capacitor, and a common mode inductor; the first capacitor is connected in series with the second capacitor to form a capacitor group; the capacitor group is connected in parallel with the third capacitor to form a first differential mode inductor.

In an embodiment, the rectifier filter circuit comprises a rectifier bridge, a first film capacitor, a second film capacitor, and a second differential mode inductor; the rectifier bridge is connected to the EMI filter circuit, the second differential mode inductor is connected to the rectifier bridge, a first end of the first film capacitor is connected to a first end of the second differential mode inductor, a first end of the second film capacitor is connected to a second end of the second differential mode inductor, and second ends of the first film capacitor and the second film capacitor are both grounded.

In an embodiment, the buck circuit comprises a buck inductor, an IC chip, a first resistor, a second resistor, a fourth capacitor, a first MOS transistor, a first rectifier diode and a first voltage stabilizing diode; a source of the first MOS transistor is connected to the IC chip, a drain of the first MOS transistor is connected to the buck inductor, a gate of the first MOS transistor is connected to a second end of the first resistor, a first end of the first resistor is connected to the second resistor, a first end of the fourth capacitor is connected to the second resistor, a second end of the fourth capacitor is grounded, an output end of the first rectifier diode is connected to the first end of the first resistor, an input end of the first rectifier diode is connected to the source of the first MOS transistor, an output end of the first voltage stabilizing diode is connected to the gate of the first MOS transistor, and an input end of the first voltage stabilizing diode is connected to the second end of the fourth capacitor.

In an embodiment, the rectifier output circuit comprises a second rectifier diode, a third rectifier diode, a first electrolytic capacitor and a second electrolytic capacitor; the second rectifier diode is connected in parallel with the third rectifier diode, and the first electrolytic capacitor is connected in parallel with the second electrolytic capacitor.

In an embodiment, the voltage stabilizing circuit comprises an inductor auxiliary winding, a first triode, a fourth rectifier diode, a second voltage stabilizing diode, a third resistor, and a fourth resistor, a first capacitor, a second capacitor, a third electrolytic capacitor, and a fourth electrolytic capacitor; the inductor auxiliary winding is configured to provide an induced voltage, an input end of the fourth rectifier diode is connected to the inductor auxiliary winding, an output end of the fourth rectifier diode is connected to a first end of the third resistor, a second end of the third resistor is connected to a collector of the first triode, a first end of the fourth resistor is connected to the output end of the fourth rectifier diode, a second end of the fourth resistor is connected to a base of the first triode, the base of the first triode is connected to the output end of the second voltage stabilizing diode, the input end of the second voltage stabilizing diode is grounded, a positive electrode of the third electrolytic capacitor is connected to the first end of the third resistor, the first capacitor is connected in parallel with the third electrolytic capacitor, a positive electrode of the fourth electrolytic capacitor is connected to an emitter of the first triode, and the second capacitor is connected in parallel with the fourth electrolytic capacitor.

In an embodiment, the control circuit comprises an IC chip, an MCU, a fifth resistor, a first resistor group, a second resistor group, and a second MOS transistor; the fifth resistor is configured to divide an input voltage and input the divided input voltage into the MCU as a determination signal, the gate of the second MOS transistor is connected to the MCU, both the first resistor group and the second resistor group comprise three resistors connected in parallel, a first end of the first resistor group and a first end of the second resistor group are both connected to the IC chip, a second end of the first resistor group is connected to the source of the second MOS transistor, a second end of the second resistor group is connected to the drain of the second MOS transistor.

In an embodiment, the control circuit further comprises a first optocoupler, a second triode, a third voltage stabilizing diode, a sixth resistor, a seventh resistor, a third MOS transistor and a fourth MOS transistor; the first optocoupler is connected to the MCU, a first end of the sixth resistor is connected to the rectifier output circuit, a drain of the third MOS transistor is connected to the rectifier output circuit, a first protection resistor is provided between the drain of the third MOS transistor and the rectifier output circuit, a gate of the third MOS transistor is connected to a second end of the sixth resistor, a source of the third MOS transistor is connected to the LED light source assembly, a first end of the seventh resistor is connected to the second end of the sixth resistor, a second end of the seventh resistor is grounded, a collector of the second triode is connected to the second end of the sixth resistor, an emitter of the second triode is grounded, a base of the second triode is connected to an input end of the third voltage stabilizing diode, an output end of the third voltage stabilizing diode is connected to a gate of the fourth MOS transistor, the output end of the third voltage stabilizing diode is connected to the first photocoupler, a drain of the fourth MOS transistor is connected to the rectifier output circuit, a second protection resistor is provided between the drain of the fourth MOS transistor and the rectifier output circuit, a source of the fourth MOS transistor is connected to the LED light source assembly.

In an embodiment, the control circuit further comprises a second optocoupler, a third optocoupler, a third MOS transistor, and a fourth MOS transistor; an input end of the second optocoupler is connected to a first pin of the MCU, an input end of the third optocoupler is connected to a second pin of the MCU, a drain of the third MOS transistor is connected to the rectifier output circuit, and a first protection resistor is provided between the drain of the third MOS transistor and the rectifier output circuit, a gate of the third MOS transistor is connected to the output end of the third optocoupler, a source of the third MOS transistor is connected to the LED light source assembly, a drain of the fourth MOS transistor is connected to the rectifier output circuit, a second protection resistor is provided between the drain of the fourth MOS transistor and the rectifier output circuit, a gate of the fourth MOS transistor is connected to the output end of the second optocoupler, and the source of the fourth MOS transistor is connected to the LED light source assembly.

In the lamp control system provided by the present disclosure, by controlling the turn-off time of the on-off switch, the brightness can be adjusted while the color temperature of the LED light source assembly is switched, which can avoid the mutual interference between the color temperature adjustment and the brightness adjustment of the lamp, the control is easy to implement, and the circuit structure is simple, the installation is easy, the hardware cost is low, and the circuit operates stably.

BRIEF DESCRIPTION OF THE DRAWINGS

The accompanying drawings here show specific examples of the technical solution of the present disclosure, and form a part of the specification with the specific embodiments in order to explain the technical solution, principles and effects of the present disclosure.

Unless otherwise specified or defined otherwise, in different drawings, the same reference signs represent the same or similar technical features, and the same or similar technical features may also be represented by different reference sings.

DESCRIPTION OF REFERENCE SIGNS

10, light source assembly; 20, AC input end; 30, EMI filter circuit; 40, rectifier filter circuit; 50, buck circuit; 60, rectifier output circuit; 70, voltage stabilizing circuit; 80, control circuit.

DETAILED DESCRIPTION

In order to facilitate the understanding of the present disclosure, specific embodiments of the present disclosure will be described in more detail below with reference to the accompanying drawings of the specification.

Unless specifically stated or defined otherwise, all technical and scientific terms used herein have the same meaning as commonly understood by those skilled in the art. In the case of combining the real scene of the technical solution of the present disclosure, all the technical and scientific terms used herein can also have meanings corresponding to the purpose of realizing the technical solution of the present disclosure.

Unless otherwise specified or defined otherwise, the expressions "first, second . . . " used herein are merely used for distinguishing the names, and does not represent a specific number or order.

Unless specifically stated or fined otherwise, the term "and/or" as used herein includes any and all combinations of one or more related listed items.

It should be noted that when a component is considered to be "fixed" to another component, it can be directly fixed to another component, or there may be an intermediate component. When a component is considered to be "connected" to another component, it can be directly connected to another component, or there may be an intermediate component at the same time. When a component is considered to be "mounted on" another component, it can be directly mounted on another component, or there may be an intermediate component at the same time. When a component is considered to be "provided on" another component, it can be directly provided on the other component, or there may be an intermediate component at the same time.

Unless specifically stated or defined otherwise, the expressions "said" and "the" used herein refer to the technical features or technical contents previously mentioned or described in the corresponding positions, which may be the same as or similar to the technical features or the technical contents referred to.

Undoubtedly, technical contents or technical features that are contrary to the purpose of the present disclosure or are obviously contradictory should be excluded.

Embodiment I

As shown in FIGS. 1 to 8, this embodiment discloses a lamp control system, which includes an LED light source assembly 10, an AC input end 20, an on-off switch, an EMI filter circuit 30, a rectifier filter circuit 40, a buck circuit 50, and a rectifier output circuit 60, a voltage stabilizing circuit 70, and a control circuit 80. The EMI filter circuit 30 is connected to the AC input end 20 through the on-off switch to access the mains AC. The EMI filter circuit 30, the rectifier filter circuit 40, the buck circuit 50 and the rectifier output circuit 60 are electrically connected in sequence. The rectifier filter circuit 40, the voltage stabilizing circuit 70, the control circuit 80, and the buck circuit 50 form a closed-loop circuit. The rectifier output circuit 60 is electrically connected to the LED light source assembly 10. By controlling the off time of the on-off switch, the brightness is adjusted while the color temperature of the LED light source assembly 10 is switched, which can avoid mutual interference between the color temperature adjustment and the brightness adjustment of the lamp, accordingly the control is easy to implement, and the circuit structure is simple, the installation is convenient, the hardware cost is low, and the circuit operates stably.

Figure 1:
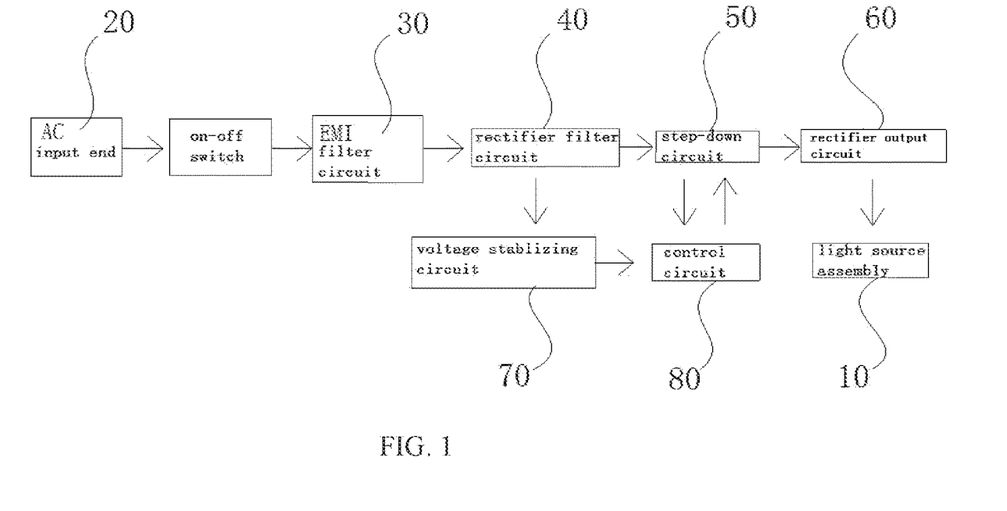
FIG. 1 is a work flow chart of a lamp control system according to an embodiment I of the present disclosure.
Figure 2:
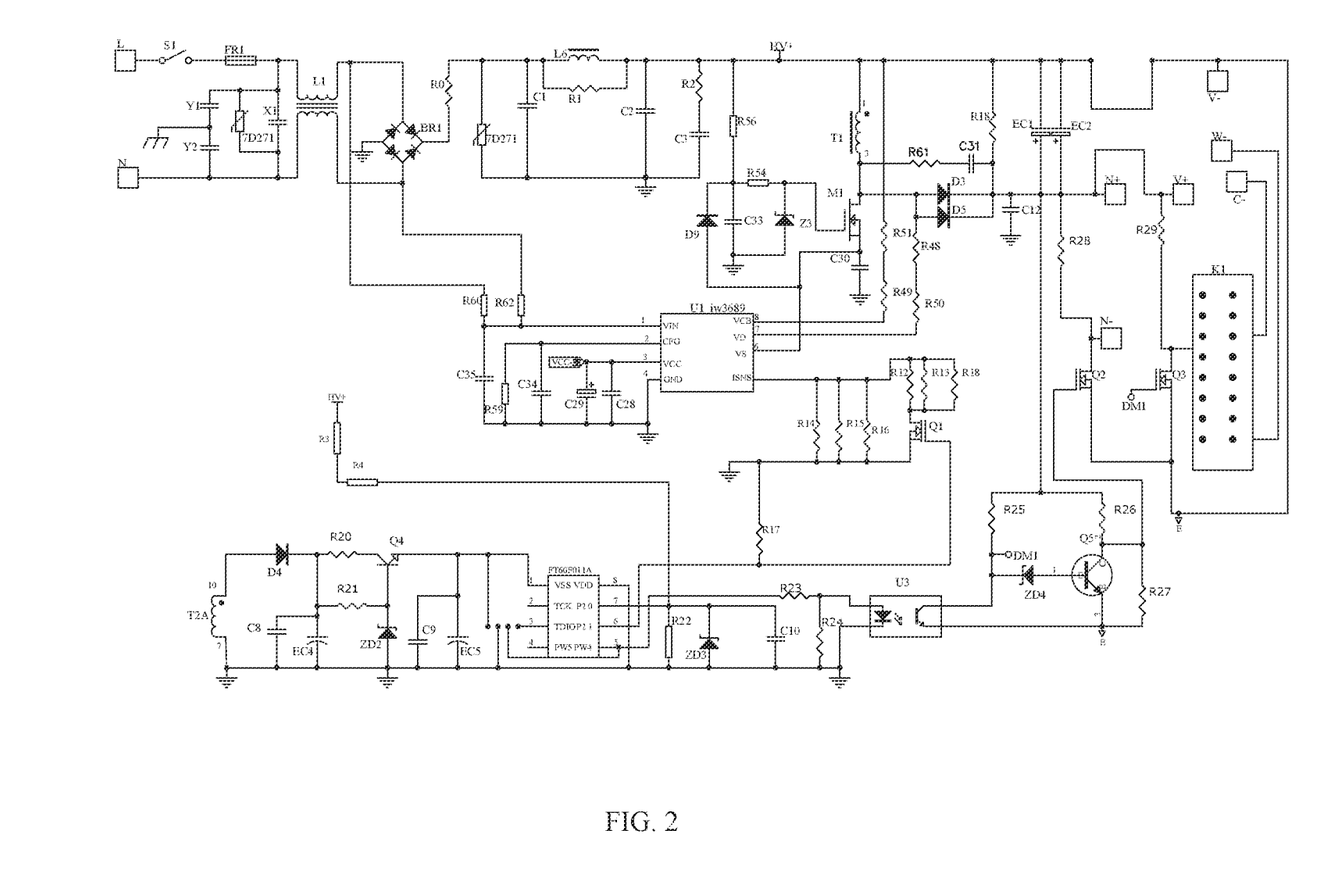
FIG. 2 is a schematic structure diagram of the lamp control system according to the embodiment I of the present disclosure.

The LED light source assembly 10 includes a PCB lamp panel and an LED mounted on the PCB lamp panel. The on-off switch refers to a device that implements a disconnection of a connection wire, and can be a single-electrode single-throw switch, a single-electrode double-throw switch, a push-button switch, a toggle switch, a wall switch, a remote control switch, etc.

Figure 3:
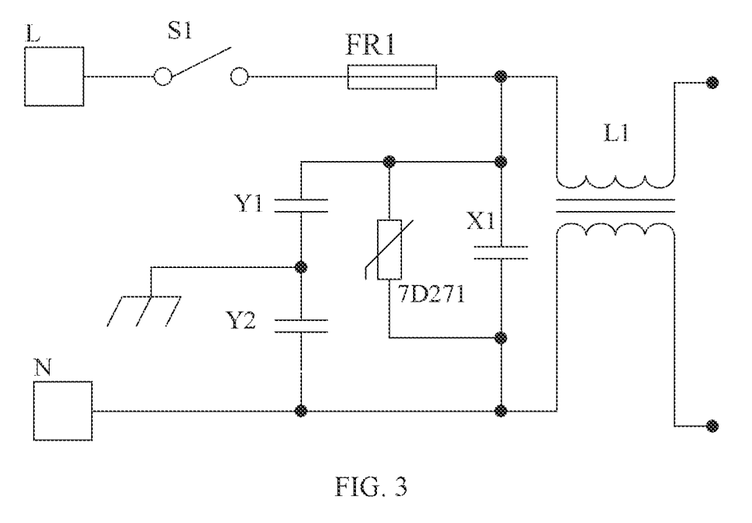
FIG. 3 is a schematic structure diagram of an EMI filter circuit in the lamp control system according to the embodiment I of the present disclosure.

As shown in FIG. 3, the EMI filter circuit 30 includes a first capacitor Y1, a second capacitor Y2, a third capacitor X1, a common mode inductor L1, etc. The first capacitor Y1 and the second capacitor Y2 are connected in series to form a capacitor group. The capacitor group is connected in parallel with the third capacitor X1 to form a first differential mode inductor. The third capacitor X1 is connected in parallel with a varistor 7D271 for a protection circuit; and the first capacitor Y1 and the second capacitor Y2 are grounded. Through the above arrangements, the differential mode interference and common mode interference in the circuit are filtered out, and the performance of the circuit system is prevented from being degraded after the interferences.

Figure 4:
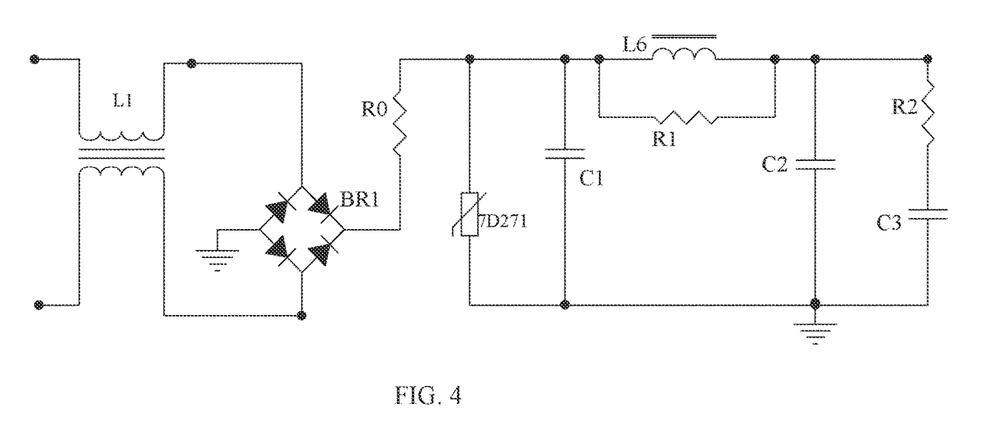
FIG. 4 is a schematic structure diagram of a rectifier filter circuit in the lamp control system according to the embodiment I of the present disclosure.

As shown in FIG. 4, the rectifier filter circuit 40 includes a rectifier bridge BR1, a first film capacitor C1, a second film capacitor C2, a second differential mode inductor L6, etc. The rectifier bridge BR1 is connected to the common mode inductor L1 at connection points connected to a positive electrode and a negative electrode of the rectifier bridge BR1, to realize the connection to the EMI filter circuit 30. The positive electrode connection of the rectifier bridge BR1 is grounded; the second differential mode inductor L6 is connected to the negative electrode connection of the rectifier bridge BR1; a resistor R0 is connected between the second differential mode inductor L6 and the rectifier bridge BR1; the second differential mode inductor L6 is connected in parallel with the resistor R1; a first end of the first film capacitor C1 is connected to a first end of the second differential mode inductor L6; and a first end of the second film capacitor C2 is connected to a second end of the second differential mode inductor L6; the second ends of the first film capacitor C1 and the second film capacitor C2 are both grounded; the first film capacitor C1 is connected in parallel with the varistor 7D271; after connected in series with the resistor R2, a film capacitor C3 is connected in parallel with the film capacitor C2. Through the above arrangements, the circuit system is rectified, the ripple is filtered and the power factor is improved, so as to avoid the problem of reducing the power supply efficiency and the LED light efficiency due to the too small output power.

Figure 5:
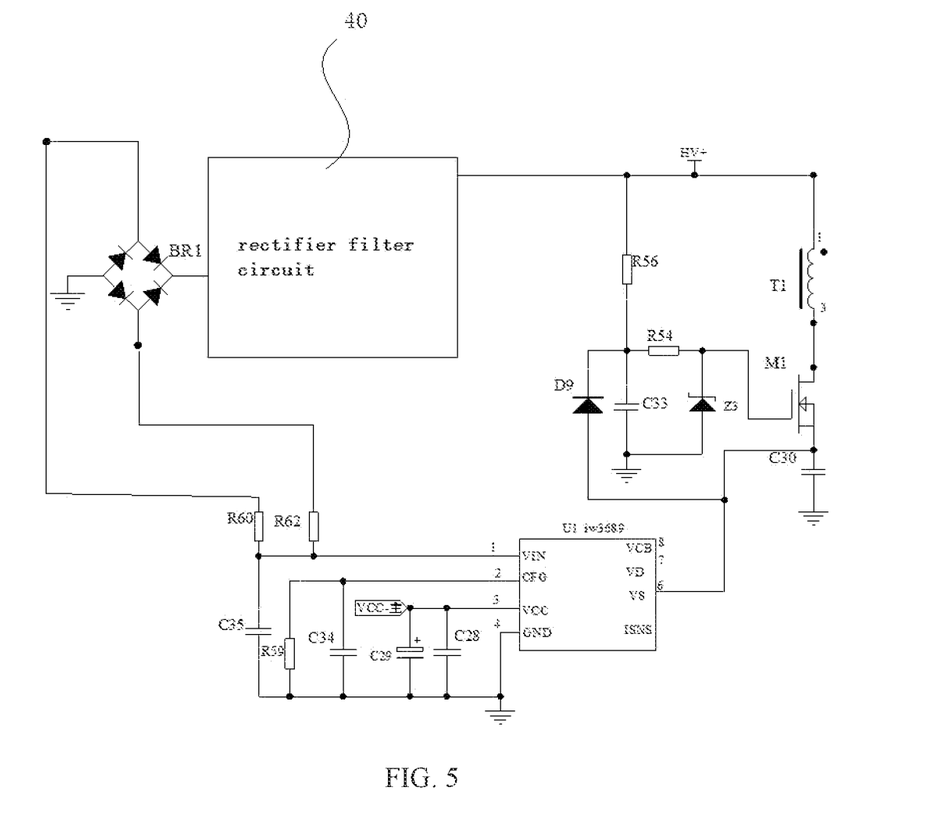
FIG. 5 is a schematic structure diagram of a buck circuit in the lamp control system according to the embodiment I of the present disclosure.

As shown in FIG. 5, the buck circuit 50 includes a buck inductor T1, an IC chip U1, a first resistor R54, a second resistor R56, a fourth capacitor C33, a first MOS transistor M1, a first rectifier diode D9, and a first voltage stabilizing diode Z3, etc. The IC chip U1 can be iw3689. A source of the first MOS transistor M1 is connected to a pin 6 of the IC chip U1, and is connected to the capacitor C30 and then grounded. A drain of the first MOS transistor M1 is connected to the second end of the buck inductor T11. A gate of the first MOS transistor M1 is connected to the second end of the first resistor R54; and the first end of the first resistor R54 is connected to the second end of the second resistor 56; the first end of the second resistor 56 is connected to the second end of the second differential mode inductor L6. The first end of the fourth capacitor C33 is connected to the second end of the second resistor R56; the second end of the fourth capacitor C33 is grounded. The output end of the first rectifier diode D9 is connected to the first end of the first resistor R54; and the input end of the first rectifier diode D9 is connected to the source of the first MOS transistor M1. The output end of the first voltage stabilizing diode Z3 is connected to the gate of the first MOS transistor M1; and the input end of the first voltage stabilizing diode Z3 is connected to the second end of the fourth capacitor C33. In addition, the resistor R56 and the first end of the buck inductor T1 are both connected to a bus, where the bus is connected to HV+; and the pin 1 of the IC chip U1 is connected to the two connection points of the rectifier bridge BR1 at the positive and negative electrodes respectively; a resistor R60 is connected between the positive electrode of the rectifier bridge BR1 and the pin 1, and a resistor R62 is connected between the negative electrode of the rectifier bridge BR1 and the pin 1. A pin 2 of the IC chip U1 is connected to resistor R59 and capacitor C35 in sequence, and then is connected to the resistor R60. The resistor R59 is connected in parallel with the capacitor C34. A pin 3 of the IC chip U1 is connected to an electrolytic capacitor C29. A capacitor C28 is connected in parallel with the electrolytic capacitor C29. A pin 4 of the IC chip U1 is grounded. The other ends of the capacitor C35, the resistor R59, the capacitor C34, the electrolytic capacitor C29, and the capacitor C28 are all grounded. A pin 8 of the IC chip U1 is connected to the resistor R49 and the resistor R51 which are connected in series, and is then connected to the bus. Through the above arrangements, the circuit current can be kept constant, and the overvoltage, overcurrent and over-temperature of the circuit can be protected. The IC chip U1 and the first MOS transistor M1 acts as switches to control. When the IC chip U1 and the first MOS transistor M1 are turned on, the buck inductor T1 stores energy; when the first MOS transistor M1 is turned off, the buck inductor T1 releases the energy.

Figure 6:
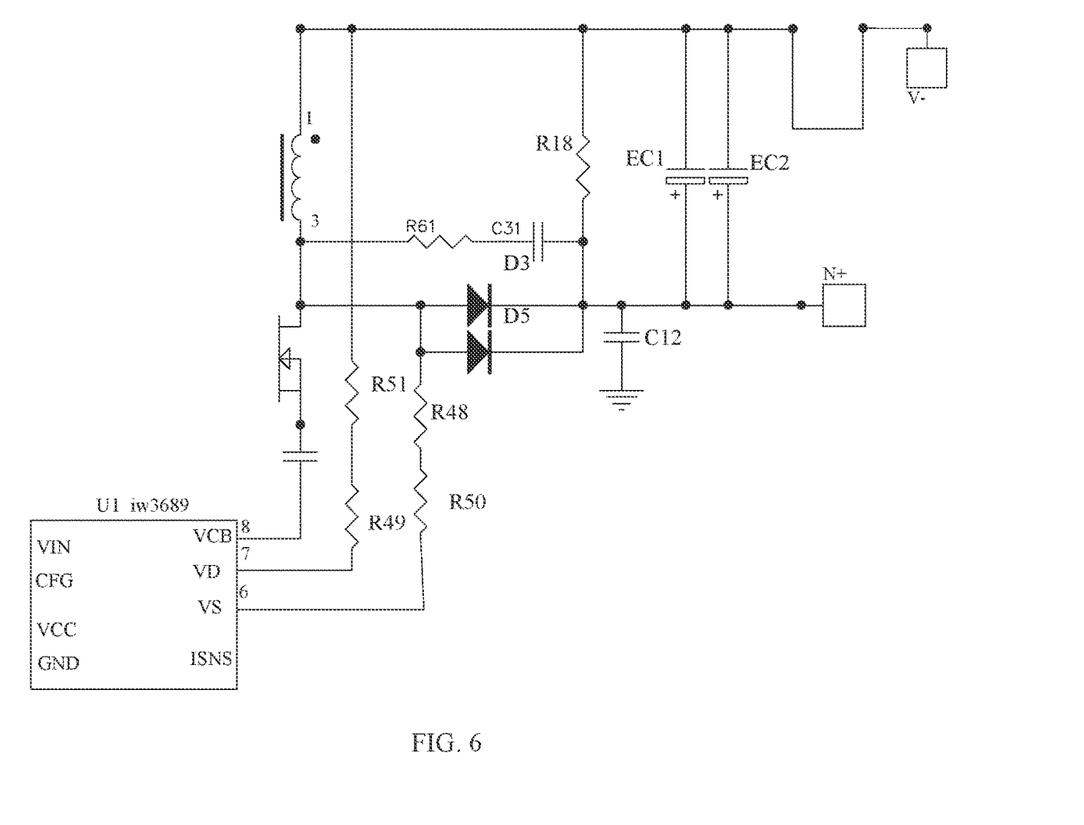
FIG. 6 is a schematic structure diagram of a rectifier output circuit in the lamp control system according to the embodiment I of the present disclosure.

As shown in FIG. 6, the rectifier output circuit 60 includes a second rectifier diode D3, a third rectifier diode D5, a first electrolytic capacitor EC1, and a second electrolytic capacitor EC2, etc. The second rectifier diode D3 is connected in parallel with the third rectifier diode D5; the first electrolytic capacitor EC1 is connected in series with the second electrolytic capacitor EC2; the input end of the second rectifier diode D3 is connected to the drain of the first MOS transistor M1; the input end of the third rectifier diode D5 is connected to the input end of the second rectifier diode D3, and is connected to the resistor R48 and the resistor R50 which are connected in series and then connected to a pin 6 of the IC chip U1. The positive electrodes of the first electrolytic capacitor EC1 and the second electrolytic capacitor EC2 are both connected to the output end of the second rectifier diode D3. The negative electrodes of the first electrolytic capacitor EC1 and the second electrolytic capacitor EC2 are both connected to the bus. The output end of the second rectifier diode D3 is connected to N+; and V+ is connected to N+. The first end of the capacitor C12 is connected to the output end of the second rectifier diode D3. The second end of the capacitor C12 is grounded. After the rectifier diode converts the alternating current to the direct current, the rectifier diode is filtered by the electrolytic capacitor to supply power to the LED light source assembly 10. The connection of the second rectifier diode D3 and the third rectifier diode D5 in parallel can withstand a larger current and functions to shunt. When one of the diodes is damaged, the other diode can allow the circuit to continue operating.

In addition, the first end of the resistor R61 is connected to the second end of the buck inductor T1; the first end of the resistor R61 is connected to the first end of the capacitor C31; the second end of the capacitor C31 is connected to the resistor R18 and then is connected to the bus; and the second end of the capacitor C31 is connected to the output end of the second rectifier diode D3. The resistor R61, the capacitor C31, and the resistor R18 form a bleeder circuit; the resistor R18 is a dummy load; and the resistor R61 and the capacitor C13 play a clamping role.

Figure 7:
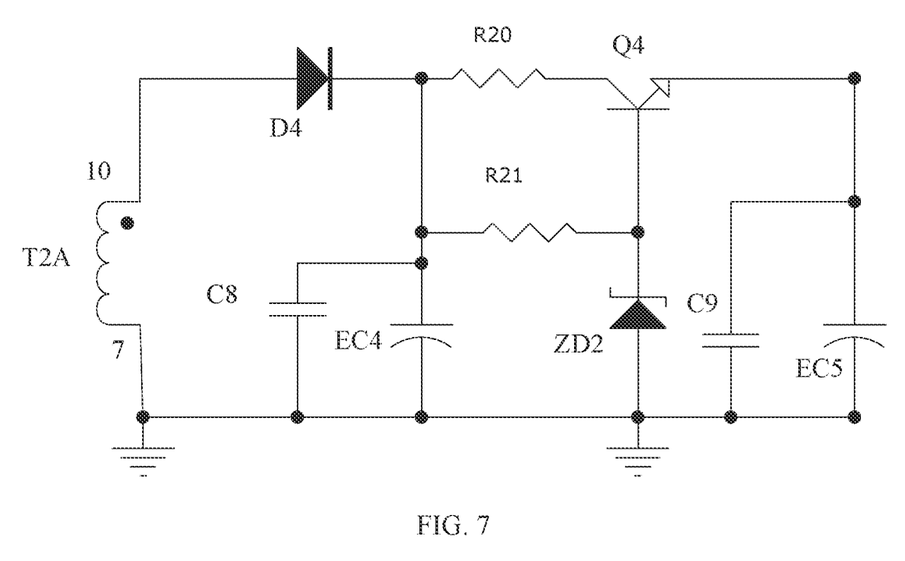
FIG. 7 is a schematic structure diagram of a voltage stabilizing circuit in the lamp control system according to the embodiment I of the present disclosure.

As shown in FIG. 7, the voltage stabilizing circuit 70 includes an inductor auxiliary winding T2A, a first triode Q4, a fourth rectifier diode D4, a second voltage stabilizing diode ZD2, a third resistor R20, a fourth resistor R21, and a first capacitor C8, a second capacitor C9, a third electrolytic capacitor EC4, and a fourth electrolytic capacitor EC5, etc. The inductor auxiliary winding T2A provides an induced voltage; the input end of the fourth rectifier diode D4 is connected to the inductor auxiliary winding T2A; the output end of the fourth rectifier diode D4 is connected to the first end of the third resistor R20; the second end of the third resistor R20 is connected to a collector of the first triode Q4; and the first end of the fourth resistor R21 is connected to the output end of the fourth rectifier diode D4; the second end of the fourth resistor R21 is connected to a base of the first triode Q4; the base of the first triode Q4 is connected to the output end of the second voltage stabilizing diode ZD2; the input end of the second voltage stabilizing diode ZD4 is grounded; the positive electrode of the third electrolytic capacitor EC4 is connected to the first end of the third resistor R20; and the first capacitor C8 is connected in parallel with the third electrolytic capacitor EC4; the positive electrode of the fourth electrolytic capacitor EC5 is connected to an emitter of the first triode Q4; and the emitter of the first triode Q4 is connected to the pin 1 of the MCU in the control circuit 80. The second capacitor C9 is connected in parallel with the fourth electrolytic capacitor EC5; the negative electrodes of the third electrolytic capacitor EC4 and the fourth electrolytic capacitor EC5 are both grounded. In the voltage stabilizing circuit 70, the resistor acts as a voltage divider, the capacitor acts as a filter, the fourth rectifier diode D4 acts as a rectifier, the second voltage stabilizing diode ZD2 functions to stabilize the voltage, and the first triode Q4 functions to stabilize the voltage, with a purpose of providing a stable voltage for the back-end control circuit 80.

Figure 8:
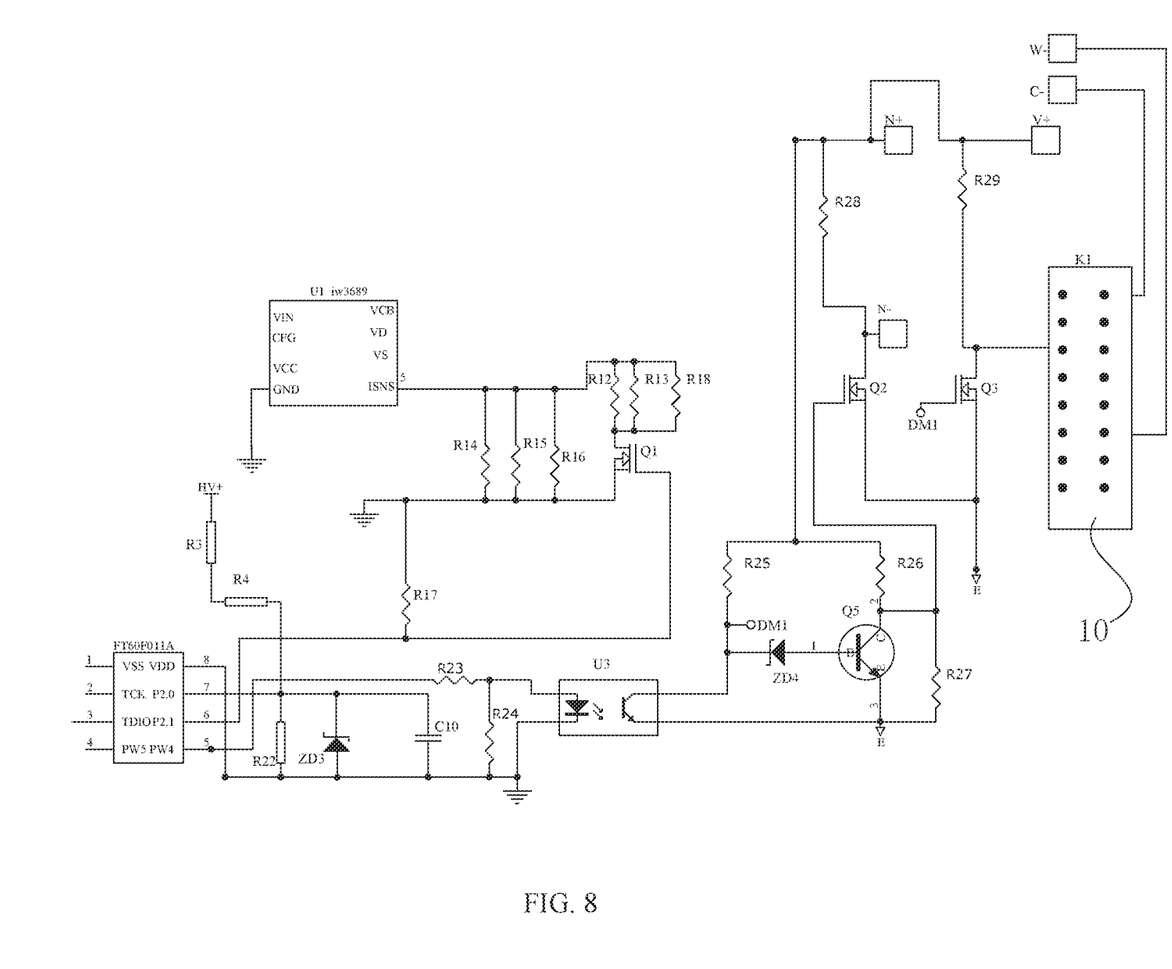
FIG. 8 is a schematic structure diagram of a control circuit in the lamp control system according to the embodiment I of the present disclosure.

As shown in FIG. 8, the control circuit 80 includes an IC chip U1, an MCU, a fifth resistor R22, a first resistor group, a second resistor group, and a second MOS transistor Q1. It should be noted that the IC chip U1 in the control circuit 80 is the same as the IC chip U1 in the buck circuit 50. The MCU can be FT60F011A; the gate of the second MOS transistor Q1 is connected to the pin 6 of the MCU; the first resistor group and the second resistor group each include three resistors connected in parallel. The first resistor group includes a resistor R14, a resistor R15, and a resistor R16. The second resistor group includes a resistor R12, a resistor R13, and a resistor R18. The first end of the first resistor group and the first end of the second resistor group are both connected to the pin 5 of the IC chip U1; the second end of the first resistor group is connected to the source of the second MOS transistor Q1; the second end of the second resistor group is connected to the drain of the second MOS transistor Q1; the source of the second MOS transistor Q1 is connected to the resistor R17 and then connected to the pin 6 of the MCU; one end of the resistor R3 is connected to the bus; the resistor R3 is connected in series with the resistor R4 and then connected to the fifth resistor R22; the first end of the fifth resistor R22 is also connected to the pin 7 of the MCU; the second end of the fifth resistor R22 and the pin 8 of the MCU are both grounded; the output end of the voltage stabilizing diode ZD3 is connected to the first end of the fifth resistor R22; the input end of the voltage stabilizing diode ZD3 is grounded; the fifth resistor R22 is also connected in parallel with the capacitor C10; the voltage stabilizing diode ZD3 functions to rectify and stabilize the voltage; the capacitor C10 acts as a filter; and the fifth resistor R22 is configured to divide the input voltage and input the divided input voltage into the MCU as a determination signal. Through the above arrangements, when the on-off switch realizes the connection and disconnection of the circuit, the level of the resistor R22 can change. When the level of the resistor R22 changes to a set value, the MCU outputs a power control signal, and the level on the pin 6 is changed to drive the source of the second MOS transistor Q1, such that the second resistor group is connected in parallel with the first resistor group, the magnitude of the power resistor of the IC chip U1 is changed, the output power is changed, and accordingly the outputted brightness is changed.

The control circuit 80 further includes a first optocoupler U3, a second triode Q5, a third voltage stabilizing diode ZD4, a sixth resistor R26, a seventh resistor R27, an eighth resistor R25, a third MOS transistor Q2, and a fourth MOS transistor Q3. The first optocoupler U3 is connected to the pin 5 of the MCU; the first end of the sixth resistor R26 is connected to the output end of the second rectifier diode D3 of the rectifier output circuit 60; the drain of the third MOS transistor Q2 is connected to the output end of the second rectifier diode D3 after passing through a first protection resistor R28; N+ is connected between the drain of the third MOS transistor Q2 and the first protection resistor R28; the gate of the third MOS transistor Q2 is connected to the second end of the sixth resistor R26; the source of the third MOS transistor Q2 is connected to the LED light source assembly 10; the first end of the seventh resistor R27 is connected to the second end of the sixth resistor R26. The second end of the seventh resistor R27 is grounded; the collector of the second triode Q5 is connected to the second end of the sixth resistor R26; the emitter of the second triode Q5 is grounded; the base of the second triode Q5 is connected to the input end of the third voltage stabilizing diode ZD4; the output end of the third voltage stabilizing diode ZD4 is connected to the pin DM1; and the output end of the third voltage stabilizing diode ZD4 is also connected to the first optocoupler U3; the pin DM1 is connected to the gate of the fourth MOS transistor Q3; the first end of the eighth resistor R25 is connected to the first end of the sixth resistor R26; the second end of the eighth resistor R25 is connected to the pin DM1; the drain of the fourth MOS transistor Q3 is connected to V+ after passing through the second protection resistor R29; the source of the fourth MOS transistor is connected to the LED light source assembly 10. The fifth resistor R22 divides the input voltage and inputs the divided input voltage to the MCU as a determination signal. When the on-off switch is turned off and then turned on, the MCU outputs different PWM signals according to different turn-off time to different MOS transistors through the first optocoupler U3. In this way, different color temperatures of the LED light source assembly 10 is controlled to turn on or off. By arranging the second triode Q5, the third voltage stabilizing diode ZD4, the sixth resistor R26, the seventh resistor R27, and the eighth resistor R25, which play a conversion role; the MCU detects the change in the level of the fifth resistor R22, changes the level of the pin 5, and controls the on and off of the first optocoupler U3. When the first optocoupler U3 is coupled, the pin DM1 is pulled down to the ground, therefore, the third MOS transistor Q2 is turned on. When the first optocoupler U3 is turned off, the third voltage stabilizing diode ZD4 behind the pin DM1 is reversely broken down to stabilize the voltage of the pin DM1, and the second triode Q5 is turned on, the voltage divided between the sixth resistor R26 and the seventh resistor R27 is pulled down to ground, accordingly the fourth MOS transistor Q3 is turned on.

In this embodiment, a control method for a lamp control system is provided, which includes the following steps:

an on-off switch is turned on, and the lamp control system is powered on;

An LED light source assembly 10 outputs a first color temperature and a first power; here the first color temperature is equal to 3000 K and the first power is equal to 10 W;

the on-off switch is turned off, and the on-off switch is turned on after a period of time t1; where 0s<t1<3s;

a control circuit 80 outputs a second color temperature control signal according to the period of time t1, and controls the LED light source assembly 10 to output a second color temperature of 2000 K;

the control circuit 80 outputs a second power control signal, a brightness of the LED light source assembly 10 is adjusted, and a second power of the LED light source assembly 10 is equal to 5 W;

the on-off switch is turned off, and the on-off switch is turned on after a period of time t2; where t2>3s;

the control circuit 80 outputs a third color temperature control signal according to the period of time t2, and controls the LED light source assembly 10 to output a third color temperature of 5000 K;

the control circuit 80 outputs a third power control signal, the brightness of the LED light source assembly 10 is adjusted, and a third power of the LED light source assembly 10 is equal to 10 W.

It should be noted that the above color temperatures and power control signals are all PWM signals outputted by the MCU. The control method is simple, and the brightness can be adjusted while the color temperature of the LED light source assembly 10 is easily adjusted without interfering with each other, and more requirements for lighting effects can be satisfied.

Embodiment II

In this embodiment, a lamp control system is further provided, with differences from the embodiment I as follows.

Figure 9:
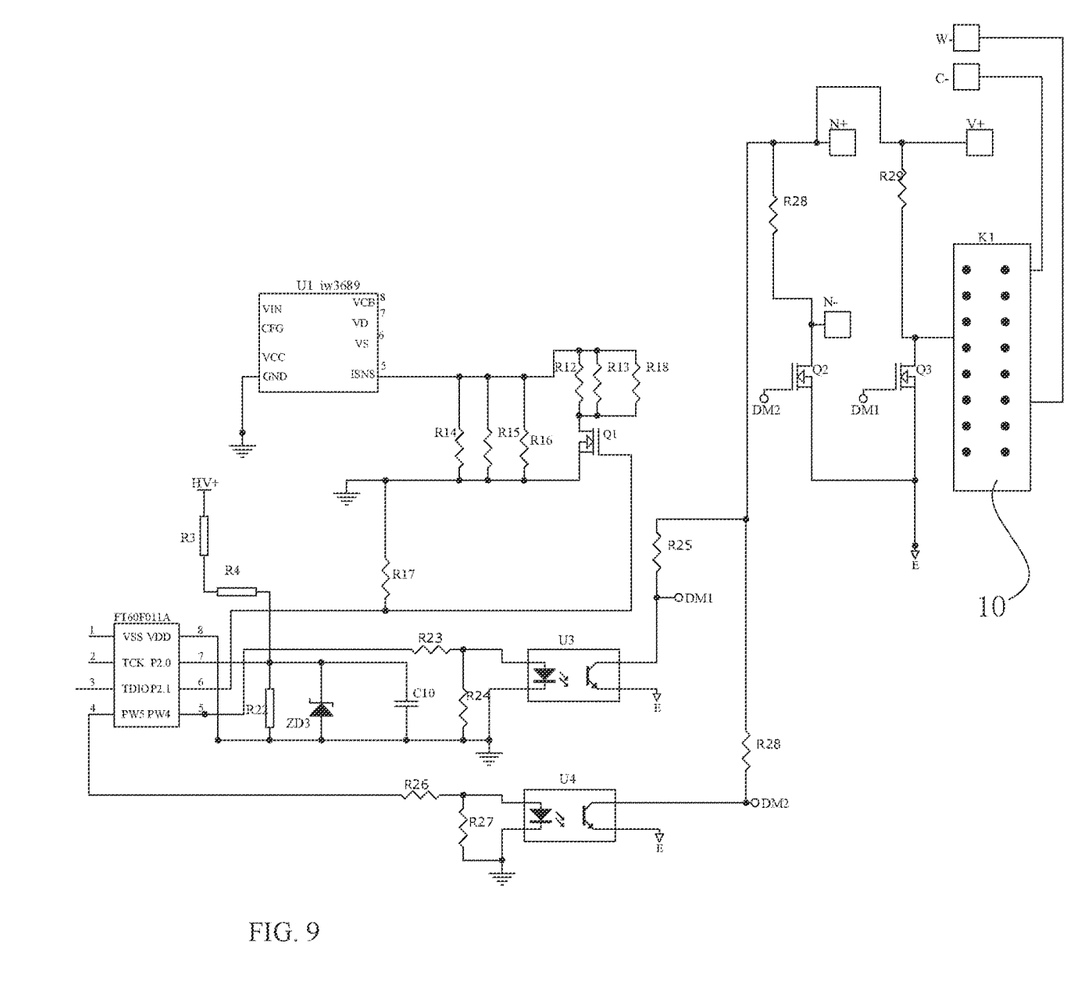
FIG. 9 is a schematic structure diagram of a control circuit in a lamp control system according to an embodiment II of the present disclosure.

As shown in FIG. 9, a color temperature control portion of the control circuit 80 includes a second optocoupler U3, a third optocoupler U4, a third MOS transistor Q2, and a fourth MOS transistor Q3. An input end of the second optocoupler U3 is connected to a pin 5 of the MCU; an input end of the third optocoupler U4 is connected to a pin 4 of the MCU; and a drain of the third MOS transistor Q2 is connected to the second rectifier diode D3 through the first protection resistor R28; N− is connected between the drain of the third MOS transistor Q2 and the first protection resistor R28; a gate of the third MOS transistor Q2 is connected to the pin DM2; the pin DM2 is connected to an output end of the third optocoupler U4; the source of the third MOS transistor Q2 is connected to the LED light source assembly 10; the drain of the fourth MOS transistor Q3 is connected to V+ through the second protection resistor R29; a gate of the fourth MOS transistor Q3 is connected to the pin DM1; the pin DM1 is connected to the output end of the second optocoupler U3; and the source of the fourth MOS transistor Q3 is connected to the LED light source assembly 10. The MCU detects a change in the level of the fifth resistor R22, and changes the level of the pin 4 or pin 5 according to the change in the level of the fifth resistor R22, thereby controlling the on and off of the second optocoupler U3 and the third optocoupler U4, to control the on and off of the third MOS transistor Q2 and the fourth MOS transistor Q3 to switch different color temperatures. When the pin 4 is powered on, the third MOS transistor Q2 is turned on; and when the pin 5 is powered on, the fourth MOS transistor Q3 is turned on.

In the lamp control system provided by the present disclosure, by turning off and then turning on the on-off switch, the MCU outputs different PWM signals according to the different turn-off time to pass through the optocouplers to different MOS transistors, thereby controlling different color temperatures of the LED light source assembly to turn on or off; at the same time, the system has the ability to adjust the output brightness, and output the PWM signal by the MCU to control the MOS transistor to turn on and off, thereby increasing the magnitude of the power resistance of the IC chip in the buck circuit, forming a switch between large and small output currents. Accordingly, the control method is simple, effective and easy to implement. In addition, the circuit structure is simple, the hardware cost is low, and the operation is stable. The lamp control system can be applied to lamps with different color temperatures and brightness requirements in different occasions, and meets more requirements of lighting effects.

For the rest of the content of this embodiment, reference can be made to the embodiment I, which will not be repeated here.

The purpose of the above embodiments is to exemplarily reproduce and derive the technical solution of the present disclosure, and to completely describe the technical solution, purpose and effects of the present disclosure, in order to make the public understand the present disclosure more thorough and comprehensive, which does not limit the protection scope of the present disclosure.

The above embodiments are not an exhaustive list based on the present disclosure. In addition to this, there may be many other embodiments not listed. Any replacement and improvement made on a basis of not violating the concept of the present disclosure shall fall within the scope of protection of the present disclosure.

What is claimed is:

1. A lamp control system, comprising: an LED light source assembly, an AC input end, an on-off switch, an EMI filter circuit, a rectifier filter circuit, a buck circuit, a rectifier output circuit, a voltage stabilizing circuit, and a control circuit; wherein, the EMI filter circuit is connected to the AC input end through the on-off switch; the EMI filter circuit, the rectifier filter circuit, the buck circuit, and the rectifier output circuit are electrically connected in sequence; the rectifier filter circuit, the voltage stabilizing circuit, the control circuit, and the buck circuit form a closed-loop circuit, the rectifier output circuit is electrically connected to the LED light source assembly, wherein the rectifier output circuit comprises a second rectifier diode, a third rectifier diode, a first electrolytic capacitor and a second electrolytic capacitor; the second rectifier diode is connected in parallel with the third rectifier diode, and the first electrolytic capacitor is connected in parallel with the second electrolytic capacitor.

2. The lamp control system according to claim 1, wherein the EMI filter circuit comprises a first capacitor, a second capacitor, a third capacitor, and a common mode inductor; the first capacitor is connected in series with the second capacitor to form a capacitor group; the capacitor group is connected in parallel with the third capacitor to form a first differential mode inductor.

3. The lamp control system according to claim 1, wherein the rectifier filter circuit comprises a rectifier bridge, a first film capacitor, a second film capacitor, and a second differential mode inductor; the rectifier bridge is connected to the EMI filter circuit, the second differential mode inductor is connected to the rectifier bridge, a first end of the first film capacitor is connected to a first end of the second differential mode inductor, a first end of the second film capacitor is connected to a second end of the second differential mode inductor, and second ends of the first film capacitor and the second film capacitor are both grounded.

4. The lamp control system according to claim 1, wherein the buck circuit comprises a buck inductor, an IC chip, a first resistor, a second resistor, a fourth capacitor, a first MOS transistor, a first rectifier diode and a first voltage stabilizing diode; a source of the first MOS transistor is connected to the IC chip, a drain of the first MOS transistor is connected to the buck inductor, a gate of the first MOS transistor is connected to a second end of the first resistor, a first end of the first resistor is connected to the second resistor, a first end of the fourth capacitor is connected to the second resistor, a second end of the fourth capacitor is grounded, an output end of the first rectifier diode is connected to the first end of the first resistor, an input end of the first rectifier diode is connected to the source of the first MOS transistor, an output end of the first voltage stabilizing diode is connected to the gate of the first MOS transistor, and an input end of the first voltage stabilizing diode is connected to the second end of the fourth capacitor.

5. The lamp control system according to claim 1, wherein the voltage stabilizing circuit comprises an inductor auxiliary winding, a first triode, a fourth rectifier diode, a second voltage stabilizing diode, a third resistor, and a fourth resistor, a first capacitor, a second capacitor, a third electrolytic capacitor, and a fourth electrolytic capacitor; the inductor auxiliary winding is configured to provide an induced voltage, an input end of the fourth rectifier diode is connected to the inductor auxiliary winding, an output end of the fourth rectifier diode is connected to a first end of the third resistor, a second end of the third resistor is connected to a collector of the first triode, a first end of the fourth resistor is connected to the output end of the fourth rectifier diode, a second end of the fourth resistor is connected to a base of the first triode, the base of the first triode is connected to the output end of the second voltage stabilizing diode, the input end of the second voltage stabilizing diode is grounded, a positive electrode of the third electrolytic capacitor is connected to the first end of the third resistor, the first capacitor is connected in parallel with the third electrolytic capacitor, a positive electrode of the fourth electrolytic capacitor is connected to an emitter of the first triode, and the second capacitor is connected in parallel with the fourth electrolytic capacitor.

6. The lamp control system according to claim 1, wherein the control circuit comprises an IC chip, an MCU, a fifth resistor, a first resistor group, a second resistor group, and a second MOS transistor; the fifth resistor is configured to divide an input voltage and input the divided input voltage into the MCU as a determination signal, the gate of the second MOS transistor is connected to the MCU, both the first resistor group and the second resistor group comprise three resistors connected in parallel, a first end of the first resistor group and a first end of the second resistor group are both connected to the IC chip, a second end of the first resistor group is connected to the source of the second MOS transistor, a second end of the second resistor group is connected to the drain of the second MOS transistor.

7. The lamp control system according to claim 6, wherein the control circuit further comprises a first optocoupler, a second triode, a third voltage stabilizing diode, a sixth resistor, a seventh resistor, a third MOS transistor and a fourth MOS transistor; the first optocoupler is connected to the MCU, a first end of the sixth resistor is connected to the rectifier output circuit, a drain of the third MOS transistor is connected to the rectifier output circuit, a first protection resistor is provided between the drain of the third MOS transistor and the rectifier output circuit, a gate of the third MOS transistor is connected to a second end of the sixth resistor, a source of the third MOS transistor is connected to the LED light source assembly, a first end of the seventh resistor is connected to the second end of the sixth resistor, a second end of the seventh resistor is grounded, a collector of the second triode is connected to the second end of the sixth resistor, an emitter of the second triode is grounded, a base of the second triode is connected to an input end of the third voltage stabilizing diode, an output end of the third voltage stabilizing diode is connected to a gate of the fourth MOS transistor, the output end of the third voltage stabilizing diode is connected to the first photocoupler, a drain of the fourth MOS transistor is connected to the rectifier output circuit, a second protection resistor is provided between the drain of the fourth MOS transistor and the rectifier output circuit, a source of the fourth MOS transistor is connected to the LED light source assembly.

8. The lamp control system according to claim 6, wherein the control circuit further comprises a second optocoupler, a third optocoupler, a third MOS transistor, and a fourth MOS transistor; an input end of the second optocoupler is connected to a first pin of the MCU, an input end of the third optocoupler is connected to a second pin of the MCU, a drain of the third MOS transistor is connected to the rectifier output circuit, and a first protection resistor is provided between the drain of the third MOS transistor and the rectifier output circuit, a gate of the third MOS transistor is connected to the output end of the third optocoupler, a source of the third MOS transistor is connected to the LED light source assembly, a drain of the fourth MOS transistor is connected to the rectifier output circuit, a second protection resistor is provided between the drain of the fourth MOS transistor and the rectifier output circuit, a gate of the fourth MOS transistor is connected to the output end of the second optocoupler, and the source of the fourth MOS transistor is connected to the LED light source assembly.

9. A lamp control system, comprising: an LED light source assembly, an AC input end, an on-off switch, an EMI filter circuit, a rectifier filter circuit, a buck circuit, a rectifier output circuit, a voltage stabilizing circuit, and a control circuit; wherein, the EMI filter circuit is connected to the AC input end through the on-off switch; the EMI filter circuit, the rectifier filter circuit, the buck circuit, and the rectifier output circuit are electrically connected in sequence; the rectifier filter circuit, the voltage stabilizing circuit, the control circuit, and the buck circuit form a closed-loop circuit, the rectifier output circuit is electrically connected to the LED light source assembly, wherein the buck circuit comprises a buck inductor, an IC chip, a first resistor, a second resistor, a fourth capacitor, a first MOS transistor, a first rectifier diode and a first voltage stabilizing diode; a source of the first MOS transistor is connected to the IC chip, a drain of the first MOS transistor is connected to the buck inductor, a gate of the first MOS transistor is connected to a second end of the first resistor, a first end of the first resistor is connected to the second resistor, a first end of the fourth capacitor is connected to the second resistor, a second end of the fourth capacitor is grounded, an output end of the first rectifier diode is connected to the first end of the first resistor, an input end of the first rectifier diode is connected to the source of the first MOS transistor, an output end of the first voltage stabilizing diode is connected to the gate of the first MOS transistor, and an input end of the first voltage stabilizing diode is connected to the second end of the fourth capacitor.

10. A lamp control system, comprising: an LED light source assembly, an AC input end, an on-off switch, an EMI filter circuit, a rectifier filter circuit, a buck circuit, a rectifier output circuit, a voltage stabilizing circuit, and a control circuit; wherein, the EMI filter circuit is connected to the AC input end through the on-off switch; the EMI filter circuit, the rectifier filter circuit, the buck circuit, and the rectifier output circuit are electrically connected in sequence; the rectifier filter circuit, the voltage stabilizing circuit, the control circuit, and the buck circuit form a closed-loop circuit, the rectifier output circuit is electrically connected to the LED light source assembly, wherein the control circuit comprises an IC chip, an MCU, a fifth resistor, a first resistor group, a second resistor group, and a second MOS transistor; the fifth resistor is configured to divide an input voltage and input the divided input voltage into the MCU as a determination signal, the gate of the second MOS transistor is connected to the MCU, both the first resistor group and the second resistor group comprise three resistors connected in parallel, a first end of the first resistor group and a first end of the second resistor group are both connected to the IC chip, a second end of the first resistor group is connected to the source of the second MOS transistor, a second end of the second resistor group is connected to the drain of the second MOS transistor.

* * * * *